UNITED STATES PATENT OFFICE.

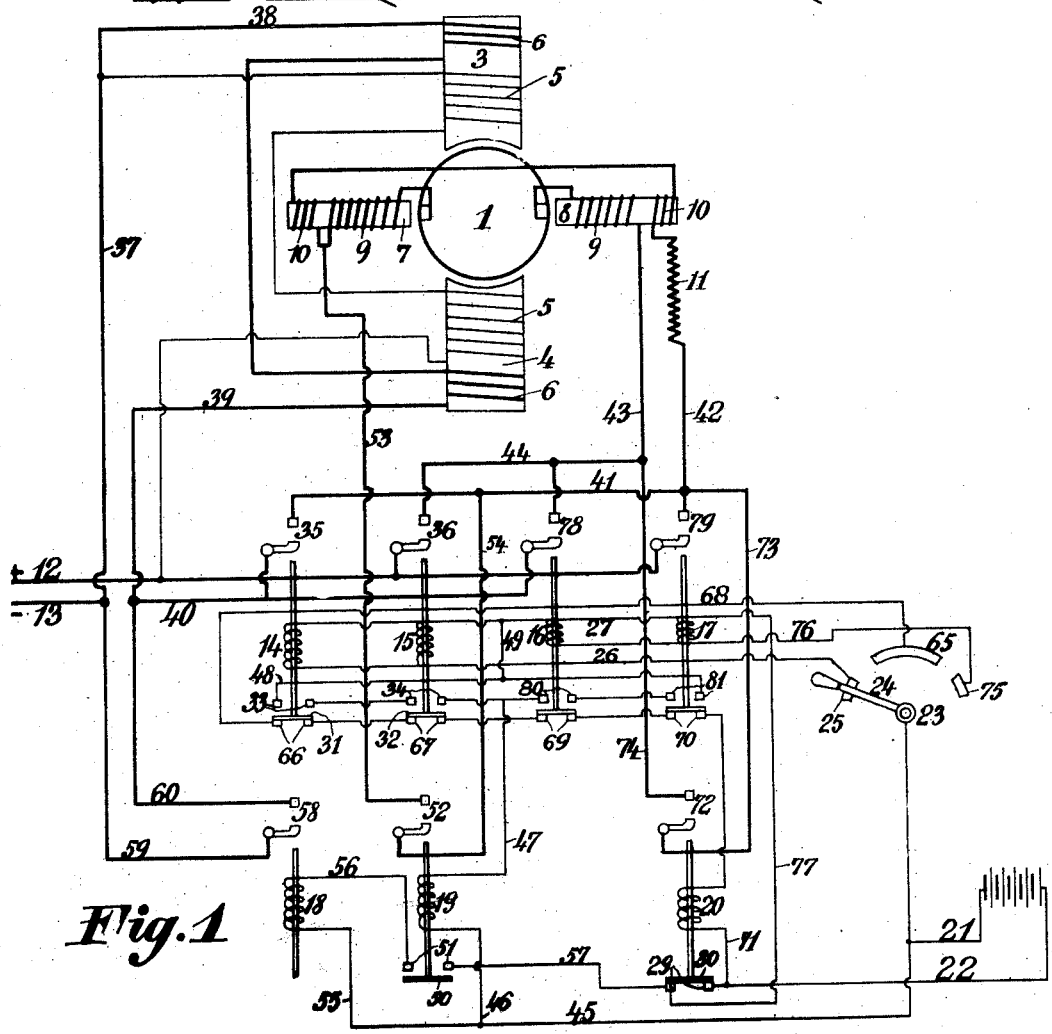
L. H. THULLEN & F. W. WILLEY.
ELECTRIC MOTOR REGULATION AND CONTROL.
APPLICATION FILED JAN. 25, 1912.
1,074,392.
Patented Sept. 30, 1913.
2 SHEETS—SHEET 1.

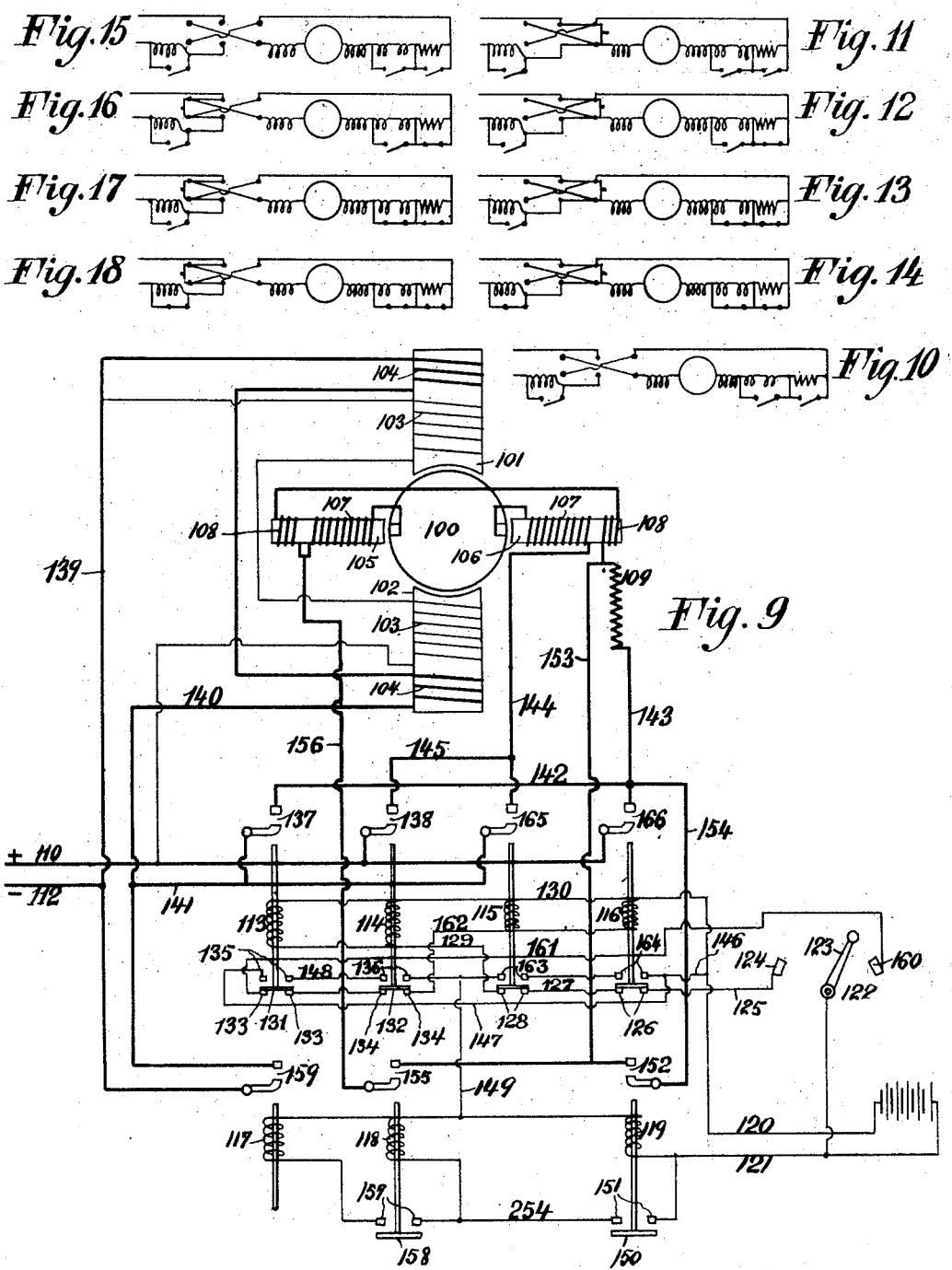

LOUIS H. THULLEN AND FRANK W. WILLEY, OF CINCINNATI, OHIO, ASSIGNORS TO THE TRIUMPH ELECTRIC COMPANY, A CORPORATION OF OHIO.

ELECTRIC-MOTOR REGULATION AND CONTROL.

1,074,392.  Specification of Letters Patent.  Patented Sept. 30, 1913.

Application filed January 25, 1912. Serial No. 673,474.

*To all whom it may concern:*

Be it known that we, LOUIS H. THULLEN and FRANK W. WILLEY, citizens of the United States, residing at Cincinnati, in the county of Hamilton and State of Ohio, have invented certain new and useful Improvements in Electric-Motor Regulation and Control, of which the following is a full, clear, and exact specification.

This invention relates to methods and apparatus for regulating and controlling electric motors.

In order to avoid sparking and secure good commutation in direct current electric motors, interpoles or commutating poles may be employed. These poles are over the armature conductors or coils which are undergoing commutation and are usually located midway between the main field poles of the motor. The commutating poles are for the purpose of furnishing a proper field within which the armature conductors move while they are being commutated. The strength of this commutating field produced by the interpoles should be of different values for different values of armature current or load in order to secure proper commutation, a heavier load or larger armature current requiring a stronger commutating magnetic field. In order that the commutating magnetic field may increase when the armature current increases, the windings on the interpoles may be connected in series with the motor armature. The magneto motive force exerted by this interpole field winding will thus vary in proportion to the armature or load current. When, however, the motor is operating on a load which varies quickly, the magnetism of the commutating poles lags quite perceptibly behind the current, with the result that during this fluctuation the interpole magnetism does not have the proper value for good commutation and there is sparking at the commutator. When sufficient time has elapsed to allow the interpole magnetism to build itself up or settle down to (according to whether the fluctuation is an increasing or decreasing one) that corresponding to the armature load or current, the commutating field will be of proper value to secure good commutation and the sparking will disappear.

It is, therefore, one object of the present invention to provide methods and means for securing good commutation and avoidance of sparking on interpole motors when the load quickly varies.

It is a further object of the invention to provide methods and means whereby proper commutation, even on abnormal load, is secured.

A further object of the invention is to provide methods and apparatus for efficiently and reliably controlling interpole motors.

Other and ancillary objects of the invention will appear hereinafter.

To illustrate the invention there has been chosen motors which, after starting, are not subjected to any abnormal load or sudden variation in load. In starting such motors, however, there is an extreme variation of the armature current or load and also the motor is subjected to an abnormally large armature current or load, and, in the illustrative examples chosen, means and methods are set forth for securing proper commutation with this quick fluctuation and abnormal load. The details of these illustrative examples will be understood from the description in connection with the accompanying drawings, of which—

Figure 1 is a diagram showing an interpole direct current motor with regulating and controlling means connected thereto, which illustrate apparatus containing the present invention and by which the method of the invention may be carried out; Figs. 2 to 8, inclusive, are simplified diagrams showing relative connections of the parts at different times in the operation of the apparatus; Fig. 9 is a diagram showing an interpole motor and connections which is modified in some features from the apparatus of Fig. 1, as will hereinafter appear, and Figs. 10 to 18, inclusive, are simplified diagrams of the connections of the apparatus of Fig. 9 at different times in the operation of that apparatus.

Referring to the drawings, and first to Figs. 1 to 8, inclusive, 1 represents a rotating armature of a direct current motor having main field poles 3 and 4. Upon the main poles 3 and 4 are shunt windings 5 and series windings 6. Also the motor is provided with inter or communicating field poles 7 and 8 provided with main interpole windings 9 and auxiliary interpole windings 10. The resistance 11 is provided for connecting in series with the armature at starting, and the electric current for operating the motor is derived from the power mains 12 and 13 which may be connected to any suitable source of electric power. The series field winding of the motor serves to give a more powerful torque such as is required in starting while the shunt field winding gives stability of speed conditions. The inter or commutating poles are located over the coils on the armature which are undergoing commutation so as to cause this operation to be carried on in a proper magnetic field to avoid sparking at the brushes and secure good commutation. The main interpole windings and their iron cores are such that within normal limits of load and in the absence of sudden and large changes in load, the proper commutating field will be secured. When, however, there is a sudden change in the load, the magnetic commutating field will not change in value with sufficient rapidity to keep pace with the altered conditions, which results in improper commutation and sparking as before set forth. Also if the load becomes abnormally large, the iron of the interpoles may become highly saturated so that the increase in load will not cause sufficient increase in the interpole magnetism to secure proper commutation. Both of these conditions, namely: sudden fluctuation in load current and abnormally large load current, occur at starting the motor and the interpole magnetism is kept up to the proper value at this time by including in circuit the auxiliary interpole windings the magneto motive force of which reinforces that of the main interpole windings, these auxiliary windings being cut out when the fluctuation and abnormal current are over. The electrical power connections of the motor are controlled by electromagnets 14, 15, 16, 17, 18, 19 and 20, which derive their electric energy from auxiliary mains 21 and 22 which are connected with any suitable source of power. The controlling circuits for the power circuits of the motor, which controlling circuits include the electromagnets 14 to 20, are controlled by a master switch 23. The details of the apparatus will be understood from the following description in connection with the operation of the apparatus. The shunt field windings 5 are permanently connected across the power supply conductors 12 and 13. Assuming that it be desired to start the motor in a certain direction of rotation, the movable arm 24 of the master switch may be moved into engagement with the left-hand contact 25, when circuit may be traced from the auxiliary supply main 21 through the switch arm 24, contact 25, conductor 26, coils 14 and 15 in parallel, conductor 27, conductor 77 and contacts 29 (which are connected by the conducting bridge 30 secured to the plunger of the magnet 20), thence to the auxiliary supply main 22. The magnets 14 and 15 will then be energized and lift their plungers. The conducting bridges 31 and 32 at the lower ends of the plungers will come against the upper contacts 33 and 34, thereby closing these pairs of contacts respectively. Also the power contacts 35 and 36 will be closed by the upward movement of the plungers. The contacts 35 and 36 being closed, circuit may be traced from the power supply conductor 13 through the conductors 37 and 38, the series field 6 of the motor, the conductor 39, conductor 40, contacts 35, conductor 41, conductor 42, armature starting resistance 11, auxiliary interpole windings 10, main interpole windings 9, the armature 1, conductor 43, conductor 44, and contacts 36 to the power supply conductor 12. The relative connections of the motor windings and armature resistance as then existing are shown in simplified fashion in Fig. 3. In this simplified figure a conventional form of reversing switch is shown having the middle contacts 61 to which the switch blades 62 are pivoted while the end pairs of contacts 63 and 64, which are cross-connected as shown, are adapted to be respectively connected with the middle contacts according to whether the switch blades are thrown to the right or to the left.

In the actual apparatus of Fig. 1 the reversing is brought about by electromagnetically operated switches as fully appears from this figure and the description in relation thereto, but the simple conventional form of reversing switch shown in Figs. 2 to 8, inclusive, answers the purpose of showing the relative connections and presents the situation in a simpler form. From Fig. 3 it will be seen that the main series field winding, the main interpole field winding, the motor armature, the auxiliary interpole field winding, and the armature resistance are all connected in series across the line. Current rushes through the armature and although cut down by the armature resistance is larger than the normal running current of the motor. This quick rush of current is properly commutated by reason of the fact that the main interpole winding, which suffices within normal running limits to produce the proper commutating field, is reinforced by the auxiliary interpole winding. The main series field winding improves the starting torque and the armature resistance prevents the current from attaining such value as would cause injury to the motor or connections. This sudden rush of large starting current starts the motor armature into rotation whereupon the counter-electromotive force developed therein gradually cuts down the current to within normal running limits. The armature resistance is then no longer required in circuit and the main interpole windings are sufficient to provide the proper commutating field. The armature resistance and auxiliary interpole windings are therefore cut out of the circuit by short circuiting them as shown in Fig. 4, the apparatus of Fig. 1 operating to bring this about in the following manner: The closing of the contacts 33 and 34 upon the energizing of the coils 14 and 15, as above noted, completes a circuit through the magnet coil 19 which may be traced from the auxiliary line conductor 21 through conductor 45, conductor 46, magnet coil 19, conductor 47, contacts 34 and 33, conductor 48, conductor 49, conductor 27, conductor 77 and contacts 29 to the other one 22 of the auxiliary supply mains. The energizing of the magnet 19 results in the lifting of its plunger and the contacting disk 50 attached thereto. The disk 50 connects the contacts 51 while the plunger pushes the contacts 52 into engagement. The closing of the contacts 52 short circuits the armature resistance and the auxiliary interpole field winding by establishing a connection from the junction of the interpole windings 9 and 10 on the left-hand interpole through the conductor 53, contacts 52 and conductor 54, to the conductor 41. The motor circuits will then be connected as indicated in Fig. 4, which is the same as Fig. 3, except that the auxiliary interpole windings and the armature resistance are shown short circuited. The series field, having performed its function, is then cut out by short circuiting it as shown in Fig. 5, the detailed operation of accomplishing this in the apparatus of Fig. 1 being as follows: The closing of the contacts 51, completes a circuit through the magnet coil 18 which may be traced from the auxiliary supply conductor 21 through the conductor 45, conductor 55, magnet coil 18, conductor 56, contacts 51, conductor 57, and contacts 29 to the other auxiliary supply conductor 22. The energizing of the magnet 18 by the completion of its circuit will cause its plunger to be lifted so that it will push the contacts 58 closed. This short circuits the main series field of the motor by completing a connection from the main supply conductor 13 through the conductor 59, contacts 58 and conductor 60 to the conductor 40. In simplified form, the relative connections of the motor windings are as shown in Fig. 5 where the connections are the same as in Fig. 4, except that the main series field of the motor is short circuited. This connection and arrangement corresponding with Fig. 5 is the normal running position of the motor.

If now, it be desired to stop the motor the contact arm 24 of the master switch will be moved into contact with the central stationary contact 65. The moving of the arm 24 from the contact 25 will break the circuits of the magnet coils 14 and 15, whereupon their plungers will drop. This will result in the closing of the contacts 66 and 67 and the opening of the contacts 35 and 36. Also the contacts 33 and 34 will be opened. The opening of the contacts 35 and 36 opens the circuit of the motor windings from the power supply conductors. The opening of the contacts 33 and 34 opens the circuit of the coil 19 which drops its plunger, opening the contacts 52 and the contacts 51. The opening of the contacts 51 opens the circuit of the coil 18 which drops its plunger and opens the contacts 58. The closing of the contacts 66 and 67 establishes connection from the master switch contact 65 through the conductor 68, contacts 66 and 67 contacts 69 and contacts 70 with one terminal of the magnet coil 20. The other terminal of the magnet coil is connected through the conductor 71 with one conductor 22 of the auxiliary supply source. The other conductor 21 being connected with the movable arm 24 of the master switch, it will be apparent that a circuit will be completed through the magnet coil 20 and, this magnet being energized, it will raise its plunger and lift the disk 30, thereby opening the contacts 29 and closing the contacts 72. The closing of the contacts 72 closes a local short circuit in which the armature, the interpole windings, both main and auxiliary, and the armature resistance are connected in series. This appears from the circuit which can be traced from the conductor 43 through the main interpole windings 9, the armature, the auxiliary interpole windings 10, and the armature resistance 11 to the conductor 42, the conductors 42 and 43 being respectively connected to the conductors 73 and 74 which are connected together by the closed contacts 72. The connections will then be as shown in Fig. 2, the closing of the armature upon a local short circuit causing the motor to run as a generator and act as a dynamic brake which brings the motor armature quickly to rest. This braking causes a quick and large rush of armature current and it will be observed that the auxiliary interpole windings are connected in circuit to reinforce the main interpole windings so that a proper commutating field is secured.

If it be desired to drive the motor in the opposite direction from that in which it was driven when the master switch contact arm 24 was in engagement with the contact 25, this contact arm is moved into engagement with the contact 75. This completes the circuit through the magnet coils 16 and 17 as follows: from the auxiliary source, through the contact arm 24, contact 75, conductor 76, magnet coils 16 and 17, conductor 77 and contacts 29 (these contacts being closed by the disk 30, the circuit of the coil 20 having been broken by the movement of the master switch arm 24 out of engagement with the contact 65) to the auxiliary line conductor 22. This will operate to close the power circuit contacts 78 and 79, close the contacts 80 and 81 in the control circuits, and open the contacts 69 and 70. Circuit connections will be formed successively as shown in Figs. 6, 7 and 8 which are the same respectively as Figs. 3, 4 and 5, except that the closing of the circuits by the energizing of the coils 16 and 17 connects the armature and interpole fields in reverse relation to the main series and shunt fields, the blades 62 of the conventional reversing switch being shown thrown to the left so as to engage with the contacts 63, instead of to the right as shown in Figs. 3, 4 and 5, representing conditions when the magnets 14 and 15 are energized. It is unnecessary to describe the formation of the other connections as they are the same and are performed in precisely the same way as was described in connection with the functioning of the apparatus when the master switch arm was in engagement with the contact 25. To stop the motor the master switch arm 24 is to be moved out of engagement with the contact 75 and into engagement with the contact 65, whereupon the operations as described in connection with the stopping of the motor by moving the switch arm from the contact 25 will be performed. In this stop position the reversing switch is shown open (Fig. 2) which corresponds to the condition that the power contacts controlled by the magnets 14 to 17 are open.

Referring now to Figs. 9 to 18 inclusive, the motor is the same as that described in connection with the preceding figures having an armature 100, main field poles 101 and 102, upon which are the main shunt winding 103 and the main series winding 104. The motor also has the inter or commutating poles 105 and 106 carrying the main interpole winding 107 and the auxiliary interpole winding 108. The starting resistance 109 is provided for including in the armature circuit when the motor is being started. The supply of power current for the motor is obtained from the power mains 110 and 112, which may be connected with any suitable source. The contacts in the power circuits are controlled by the electro-magnets 113, 114, 115, 116, 117, 118, and 119, the circuits of which derive their electric power from auxiliary supply mains 120 and 121, these control circuits being controlled by means of a master switch 122. The details will be understood in connection with the following description of the operation. With the movable arm 123 of the master switch out of engagement with the stationary contacts as shown, the apparatus will be in the condition as shown in Fig. 9 and as shown in simplified form in Fig. 10; that is, the circuits are open so that no current flows either in the control or motor circuits. If now it be desired to operate the motor in one direction of rotation, the contact arm 123 of the master switch may be moved into contact with the stationary contact 124. Circuit may now be traced from the auxiliary main 121 through the contact arm 123, contact 124, conductor 125, contacts 126, conductor 127, contacts 128, conductor 129, the magnet coils 113 and 114 in parallel, and the conductor 130 to the other auxiliary main 120. The magnets 113 and 114 being thus energized, their plungers will be lifted carrying the conducting bridges 131 and 132. The connections between the pairs of contacts 133 and 134 will thus be broken while the contacts 135 and 136 will be respectively closed. Also these plungers will push the power contacts 137 and 138 into closed position. Circuit may now be traced from the power supply main 112 through the conductor 139, main series field 104, conductor 140, conductor 141, contacts 137, conductor 142, conductor 143, armature resistance 109, auxiliary interpole winding 108, interpole winding 107, armature 100, conductor 144, conductor 145, and contacts 138 to the power supply main 110. The relative connections are now as shown in Fig. 11, from which (it will be observed that the reversing switch is shown in these simplified diagrams the same as in Figs. 2 to 8 inclusive) it will be seen that the main series field, the main interpole windings, the armature, the auxiliary interpole windings and the armature resistance are connected in series in the circuit. The rush of starting current as described in connection with the apparatus in Fig. 9 takes place, and the motor starts to rotate, the proper commutating field being secured by reason of the main interpole windings being reinforced by the auxiliary interpole windings. The armature resistance cuts down the armature current and the series field aids the starting torque as before described. The motor having thus been started into rotation, its counter-electromotive force will cut down the armature current, the necessity for the limiting effect of the armature starting resistance will no longer exist and this resistance may be then cut out. This is done in the following manner. In the lifting of the plungers of the magnets 113 and 114 as just described, it has been noted that the contacts 135 and 136 will be closed. Circuit may then be traced from the auxiliary supply conductor 120 through the conductor 146, conductor 147, contacts 135, conductor 148, contacts 136, conductor 149, and magnet coil 119 to the other auxiliary supply conductor 121. The magnet 119 being energized will raise its plunger and the conducting bridge 150 so that the contacts 151 will be closed and also so that the motor circuit contacts 152 will be closed. The closing of the contacts 152 connects the conductors 153 and 154 connected respectively with the extremes of the armature resistance so that that resistance is short-circuited. The motor connections will then be as shown in Fig. 12, wherein it will be seen that the armature resistance 109 is short-circuited and thereby cut out of service.

The rush of current being now over and the current having subsided to a value within normal limits, the reinforcement of the commutating magnetism furnished by the auxiliary interpole windings is no longer necessary so these auxiliary windings may be cut out. This is accomplished in the following way: It has been observed that the energizing magnet 119 closes the contact 151. Circuit may therefore be traced from the auxiliary supply main 120 through conductor 146, conductor 147, contacts 135, conductor 148, contacts 136, conductor 149, magnet coil 118, conductor 254, and contacts 151 to the other auxiliary supply main 121. The energizing of the coil 118 causes its plunger to be lifted thereby closing the motor circuit contacts 155. This short-circuits the auxiliary interpole winding and cuts it out of service by connecting together the conductors 156 and 153, which are respectively connected to the terminals of the auxiliary interpole winding. The connection of the motor circuits are then as shown in Fig. 13 and are the same as shown in Fig. 12, except that the auxiliary interpole windings have been cut out of service by short-circuiting them. The function of the main series field winding in producing starting torque being no longer necessary, this winding may be cut out of circuit, which is done in the following manner in the apparatus of Fig. 9: The lifting of the plunger of the magnet 118 serves to close the contacts 157 by means of a conducting bridge 158. Circuit may then be traced from the auxiliary supply conductor 120 through the conductor 146, conductor 147, contacts 135, conductor 148, contacts 136, conductor 149, magnet coil 117, contacts 157, conductor 254 and contacts 151 to the other auxiliary supply main 121. The plunger of the magnet 117 will then be lifted closing the motor circuit contacts 159, which connects together the conductors 139 and 140, which are respectively connected to the terminals of the main series field winding. The main series field winding will therefore be short-circuited and cut out of service, the relative connections being as shown in Fig. 14, which is the same as Fig. 13, except that the series winding has now been short-circuited. If now it be desired to stop the motor the master switch arm 123 will be moved to the position as shown in the drawings whereupon the circuits of the magnet coils 113 and 114 will be broken. Thereupon their plungers would be released with the result that various contacts would be broken so that the motor circuit connections would return to the condition as shown in Fig. 10. The circuits being thus broken, the motor will be deprived of power and come to a stop. Should it be desired to hasten the stopping of the motor the master switch-arm 122 might be thrown over in momentary engagement with the contact 160, which would connect the motor for reverse rotation with the armature resistance 109 in circuit. With the motor stopped and the circuits in condition as shown in Figs. 9 and 10, if it be desired to operate the motor with the reverse rotation from that which it had when the master switch arm 123 was in engagement with the contact 124, this switch-arm may be thrown into engagement with the contact 160, when circuit may be traced from the auxiliary supply main 121 through the master switch-arm 123, contact 160, conductor 161, contact 133, contacts 134, conductor 162, magnets 115 and 116 to the other auxiliary supply conductor 120. The plungers of these magnets will then be raised opening the contacts 128 and 126 and closing the contacts 163, and 164 in the control circuit and closing contacts 165 and 166 in the motor circuits. Motor circuits will then be connected as shown in Fig. 15 which is the same as Fig. 11, except that the relative directions of current in the main series and shunt fields of the motor on the one hand and those in the armature and inter-pole windings on the other are reversed, the conventional reversing switch of the simplified figures, which is the same as that employed in the Figs. 2 to 8 inclusive, being shown as thrown to the left in Fig. 15, instead of to the right as in Fig. 11. The successive energizations of the magnets 119, 118 and 117 will then occur in a manner analogous to that described in connection with the other direction of rotation of the motor when the master switch-arm was in engagement with the contact 124, these successive energizations serving to successively short-circuit and cut out of service the armature resistance, the auxiliary inter-pole windings and the main series field winding, these successive conditions being shown by the simplified diagrams 16, 17 and 18.

Under some circumstances it may be possible or desirable to omit the armature starting resistance.

As the main shunt field of the motor in both Figs. 1 and 9 of the drawings is permanently connected to the power supply conductors and therefore has no change in its connections during the various steps of control, this winding has been omitted from the simplified diagrams (Figs. 2 to 8 inclusive and Figs. 10 to 18 inclusive of the motor circuits.)

It will be well understood by those skilled in the art that numerous changes may be made in the apparatus shown in the drawings or the methods employed in their operation without departing from the spirit of this invention, so that the invention is not limited to the structures shown in the drawings or the methods employed in operating those structures.

Having thus described our invention, we declare that what we claim as new and desire to secure by Letters Patent, is:—

1. The combination with a motor having interpoles securing good commutation during normal operation of the motor, of means for causing reinforcement of the interpole magnetism to hasten its change, such reinforcement being beyond proportionality to the change in load current, means for placing said hastening means in operation at a time of abnormally quick change of motor load current and means for rendering the hastening means inactive.

2. The combination with a motor having interpoles securing good commutation during normal operation of the motor, of means for causing reinforcement of the interpole magnetism to hasten its change, such reinforcement being beyond proportionality to the change in load current, means for placing said hastening means in operation at a time of abnormally quick change of motor load current and electro-magnetic means for rendering the hastening means inactive.

3. The combination with an interpole motor having main field winding and main and auxiliary windings upon its interpoles, of means for including said interpole main and auxiliary windings, the main field windings and the armature of said motor in circuit and then rendering said auxiliary interpole windings inactive but leaving the main interpole winding active.

4. The combination with an interpole motor having a main series field winding and main and auxiliary interpole windings, of means for connecting said series field winding, said interpole windings and the armature of said motor in circuit, then rendering said auxiliary interpole winding inactive and then rendering said main series field winding inactive.

5. The combination with a motor having interpoles securing proper value of the interpole magnetism for good commutation during normal operation of the motor, said interpoles having a main winding and an auxiliary winding, of means for placing said auxiliary interpole winding in circuit at a time when the load current is changed with abnormal quickness, connecting said auxiliary winding in different circuit combinations from those of the main winding and rendering the said auxiliary winding inactive while leaving the main interpole winding active.

6. The combination with a motor having interpoles securing proper value of the interpole magnetism for good commutation during normal operation of the motor, said interpoles having a main winding and an auxiliary winding, of means for placing said auxiliary interpole winding in circuit at a time when the load current is changed with abnormal quickness, connecting said auxiliary winding in different circuit combinations from those of the main winding and electromagnetic means for rendering said auxiliary winding inactive.

7. The combination with a motor having an armature and interpoles having main and auxiliary windings, of a source of current supply, means for connecting said armature and main and auxiliary interpole windings to said source of supply to start said motor and electromagnetic means controlled by said connecting means for rendering said auxiliary interpole winding inactive, but leaving said main interpole winding active.

In testimony whereof we affix our signatures, in presence of two witnesses.

L. H. THULLEN.
F. W. WILLEY.

Witnesses:
EMILY M. POTTER,
CHAS. G. TANGEMAN.

Copies of this patent may be obtained for five cents each, by addressing the "Commissioner of Patents, Washington, D. C."